United States Patent [19]
Vila-Masot et al.

[11] Patent Number: 5,146,398
[45] Date of Patent: Sep. 8, 1992

[54] POWER FACTOR CORRECTION DEVICE PROVIDED WITH A FREQUENCY AND AMPLITUDE MODULATED BOOST CONVERTER

[75] Inventors: Oscar Vila-Masot, Puerto La Cruz, Venezuela; Janos Melis, Miami, Fla.

[73] Assignee: LED Corporation N.V., St. Maarten, Netherlands Antilles

[21] Appl. No.: 747,651

[22] Filed: Aug. 20, 1991

[51] Int. Cl.⁵ .......................... H02M 7/06; G05F 1/70
[52] U.S. Cl. ........................................ 363/89; 363/80; 323/222
[58] Field of Search .................. 363/79, 80, 81, 89, 363/90; 323/222

[56] References Cited

U.S. PATENT DOCUMENTS

| | | | |
|---|---|---|---|
| 4,677,366 | 6/1987 | Wilkinson | 323/222 |
| 4,943,902 | 7/1990 | Severinsky | 363/80 |
| 5,001,620 | 3/1991 | Smith | 363/89 |
| 5,003,454 | 3/1991 | Bruning | 363/81 |
| 5,006,975 | 4/1991 | Neufeld | 363/80 |
| 5,047,912 | 9/1991 | Pelly | 363/89 |

Primary Examiner—Steven L. Stephan
Assistant Examiner—Adolf Berhane
Attorney, Agent, or Firm—Hoffman, Wasson & Gitler

[57] ABSTRACT

A power factor correction circuit used to improve the ratio of real power to apparent power in an electric power distribution line containing a source of AC sinusoidal voltage and a load. The circuit includes a frequency and amplitude modulated boost converter forcing the input current to have the same wave shape as that of the input voltage.

3 Claims, 4 Drawing Sheets

5,146,398

POWER FACTOR CORRECTION DEVICE PROVIDED WITH A FREQUENCY AND AMPLITUDE MODULATED BOOST CONVERTER

BACKGROUND OF THE INVENTION

1. Field of the Invention

The present invention relates to the use of switch-mode power converters providing power factor correction. More specifically, the present invention relates to a frequency and amplitude modulated boost converter, which forces the input current to have the same wave shape as that of the input voltage.

2. Prior Art

In an electric power distribution line, the power factor is defined as the ratio of real power (watts) to apparent power (volt-amperes). The optimum value for this ratio is unity, a value that is obtained only when the line current is sinusoidal and in phase with a sinusoidal line voltage.

Historically, the main cause of a lower power factor was the phase lag caused by inductive characteristics of electric motors. Phase lag can, therefore, be corrected by simply adding the correct amount of capacitance in shunt with the electric motors.

Recently, the enormous increase in the number of computers and similar equipment incorporating line rectifiers followed by capacitor-input filters, has changed the nature of the problem. The current drawn by a computer or similar equipment is distinctly non-sinusoidal, with the distorted current waveform being the sum of many components of different frequencies. These components contribute to the total line losses, and because they add to the current actually required by the user, they mandate the use of heavier wiring and circuit breakers, meaning increased installation costs. The resulting power factor may be as low as 50% under these conditions.

Presently, this problem has been addressed by the generally used solution of significantly increasing the power factor using a fixed-frequency pulse width modulated (PWM) boost converter, provided between a rectifier and an energy storage capacitor. This PWM boost converter forces the replenishing current to have the same waveshape as that of the line voltage. However, this configuration has not provided an entirely suitable solution to the problem of power factor correction in the present environment.

SUMMARY OF THE INVENTION

The present invention overcomes the deficiencies of the prior art by providing a frequency and amplitude modulated PWM boost converter between a fully rectified sinusoidal AC source and a resistive load, producing a sinusoidal input current in phase with the sinusoidal input voltage, thereby attaining a high power factor.

Another object of the present invention is to provide a regulated DC supply powering the control apparatus for the special case of boost converters.

A further object of the present invention is to provide an inrush current limiter apparatus for the special case of boost converters.

For a better understanding of the present invention, together with other and further objects thereof, reference is made to the following description, taken in conjunction with the accompanying drawings.

DETAILED DESCRIPTION

Figure 1:
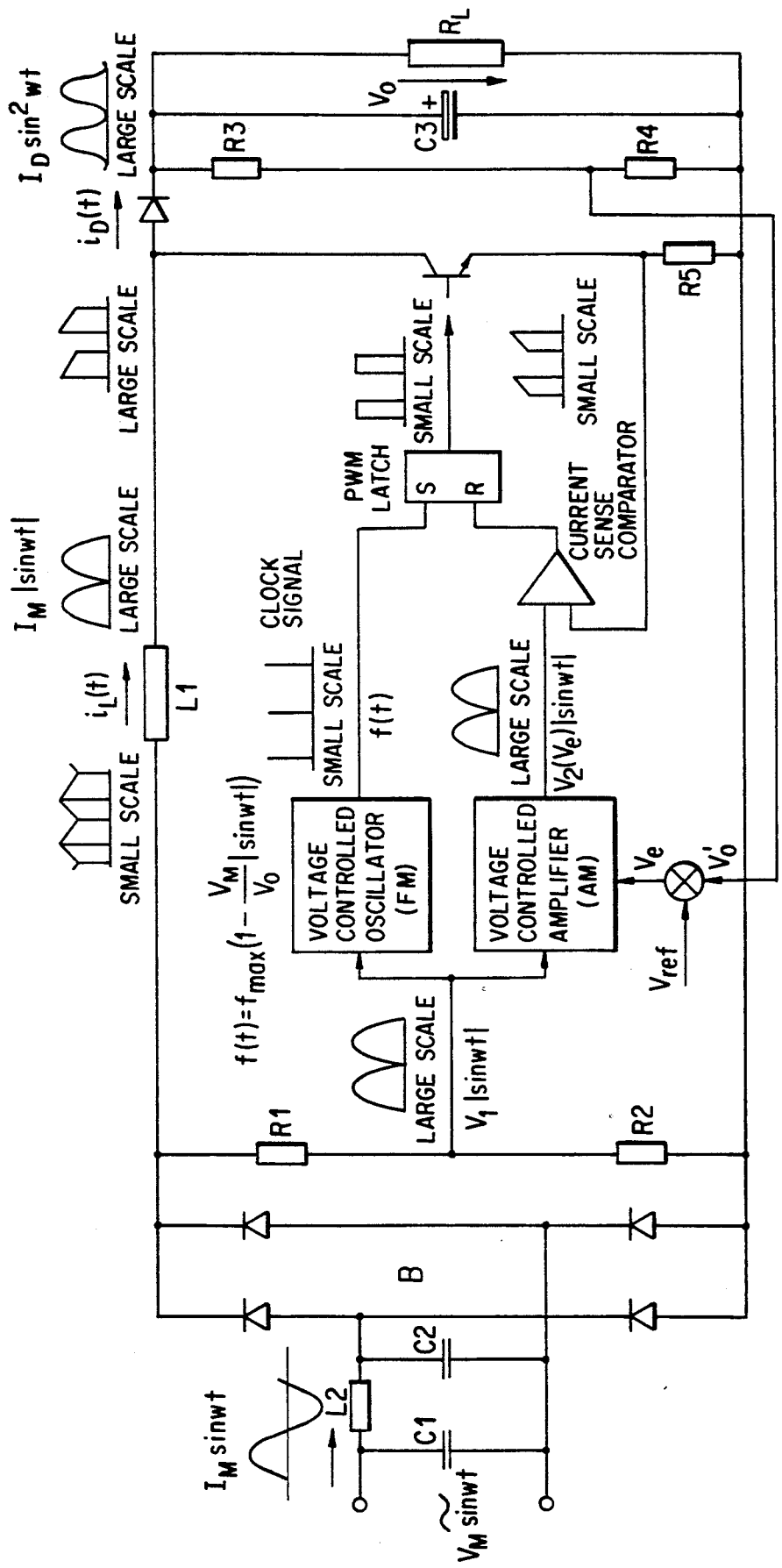
FIG. 1 illustrates a schematic diagram of the frequency and amplitude modulated boost converter as a power factor corrector according to the present invention.

FIG. 1 shows a schematic diagram of the frequency and amplitude modulated boost converter used as power corrector. As illustrated, the peak value of the inductor current $i_L(t)$ converted to a voltage signal across the resistor $R_S$ is amplitude modulated with a full-wave rectified sinusoidal voltage signal $V_2(V_e)|\sin \omega t|$. The amplitude $V_2(V_e)$ depends on the error voltage signal $V_e = V_{ref} - V'_o$, where $V_{ref}$ is a reference voltage and $V'_o$ is proportional to the output voltage $V_o$. The amplitude modulator is a voltage controlled amplifier.

This figure also illustrates the use of a boost converter for power factor correction provided between an AC source connected across a full-bridge rectifier B and a storage capacitor C3 provided across a load RL. The boost converter consists of a voltage controlled oscillator and an amplitude modulated voltage controlled amplifier. A direct current voltage reference $V_{ref}$ is connected to the voltage controlled amplifier. The outputs of the voltage controlled oscillator are connected to a PWM latch and the output of the voltage controlled amplifier is connected to the PWM latch through a current sense comparator. The output of the PWM latch is fed to a transistor or MOSFET type switch fed back to the current sense comparator. This configuration forces the input current to have a similar wave shape and phase as the line voltage, thereby producing a good power factor. The amplitude of the output signal of the voltage controlled amplifier varies with the absolute value of the sinusoidal AC voltage and is in phase therewith. The amplitude is controlled by the difference between the output DC voltage and the reference voltage $V_{ref}$. Additionally, the voltage controlled clock oscillator is continuously modulated by the absolute value of the sinusoidal input voltage in such a manner that the frequency of the oscillator is at a maximal level when the absolute value of the sinusoidal voltage source is zero, and is at a minimal level when the absolute value of the sinusoidal input voltage is at a maximal level.

Figure 2:
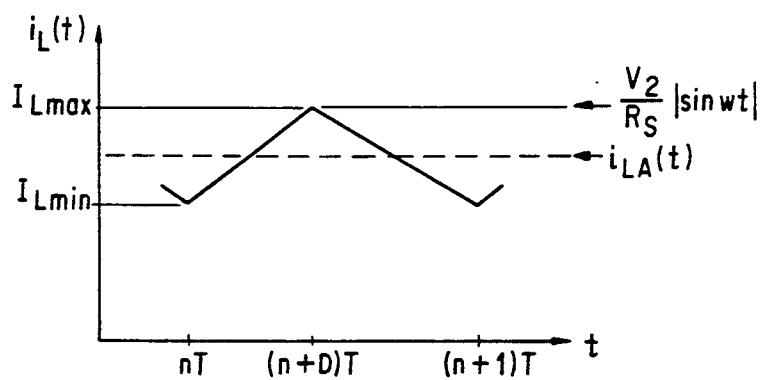
FIG. 2 illustrates the amplitude modulated inductor current in a small time scale.

FIG. 2 illustrates in a small time scale an amplitude modulated inductor current $i_L(t)$, where $i_{LA}(t)$ is the average inductor current with respect to a high frequencial period time.

Figure 3A:
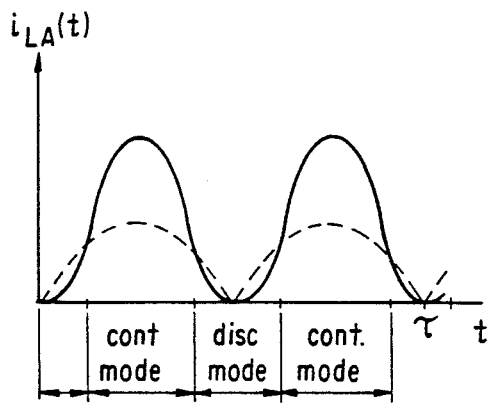
FIG. 3A illustrates the amplitude modulated average inductor current in a large time scale, without using frequency modulation.

FIG. 3A illustrates in a large time scale an amplitude modulated average inductor current $i_{LA}(t)$ if the frequency is fixed. The average inductor current $i_{LA}(t)$ is not exactly sinusoidal in the continuous mode and the difference is significant in the discontinuous mode. This difference can be totally eliminated and the average inductor current $i_{LA}(t)$ will be exactly sinusoidal if the frequency f is changing periodically by the following equation:

$$f(t) = f_{max}\left(1 - \frac{V_M}{V_o}|\sin\omega t|\right), V_o > V_M \quad (1)$$

where $V_o$ is the output DC voltage, $V_M$ is the amplitude, and $\omega$ is the frequency of the sinusoidal input voltage.

Figure 3B:
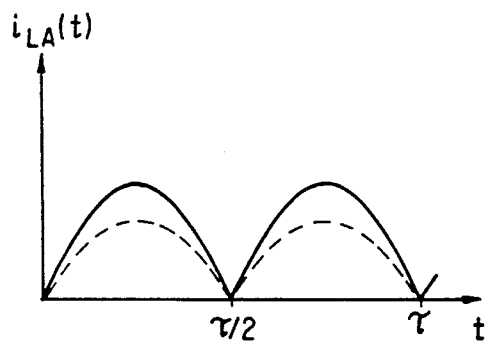
FIG. 3B illustrates the amplitude modulated average inductor current in a large time scale using frequency modulation.

FIG. 3B illustrates the amplitude modulated average inductor current in a large time scale using the described frequency modulation method.

Figure 4:
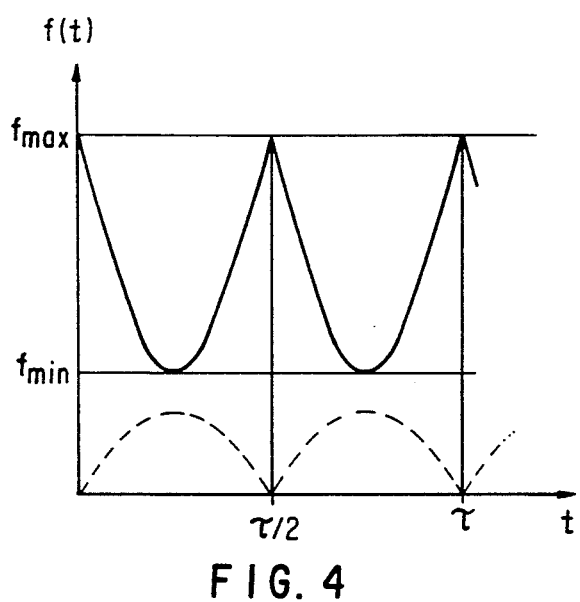
FIG. 4 shows the preferred periodical time function with respect to frequency according to the teachings of the present invention.

FIG. 4 shows the preferred periodical time function of frequency f(t) if $V_M/V_o = \frac{2}{3}$.

Figure 5:
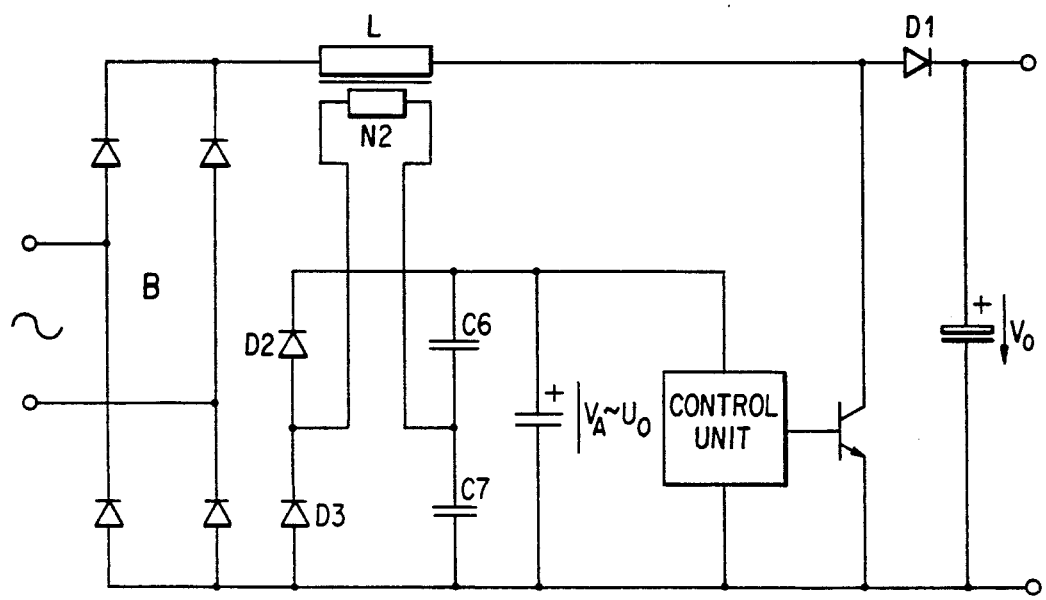
FIG. 5 shows the preferred embodiment of a regulated auxiliary DC supply for boost converters.

FIG. 5 shows the preferred embodiment of a regulated auxiliary DC supply for boost converters. A second winding N2 of inductor L is connected to a half-bridge rectifier including two rectifiers D2, D3 and two capacitors C6, C7. The output voltage $V_A(t)$ is fluctuated by 120 Hz, but the average value of $V_A(t)$ is proportional to the regulated output voltage $V_o$.

Figure 6:
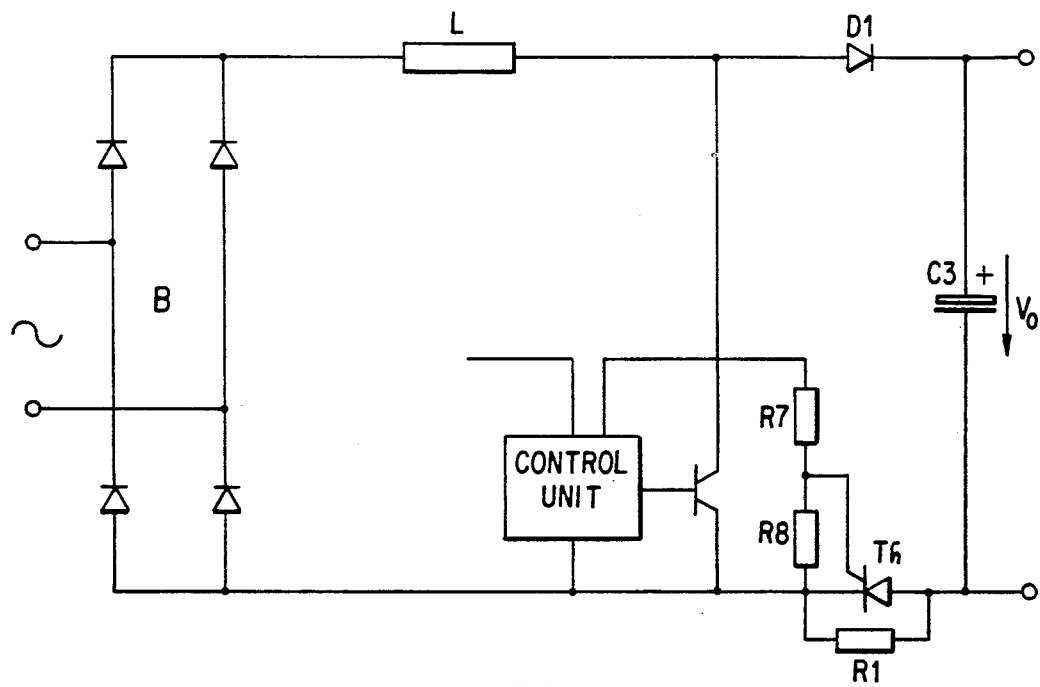
FIG. 6 shows the preferred embodiment of an inrush current limiter for boost converters.

FIG. 6 shows the preferred embodiment of an inrush current limiter for boost converters. The inrush current is limited by resistor R1 provided across thyristor Th. When the output capacitor C3 is charged, the control apparatus continuously provides an ON signal for the sensitive gate thyristor Th. The position of the thyristor in the circuit configuration is important because it produces a relatively small loss and the control is easy.

Figure 7:
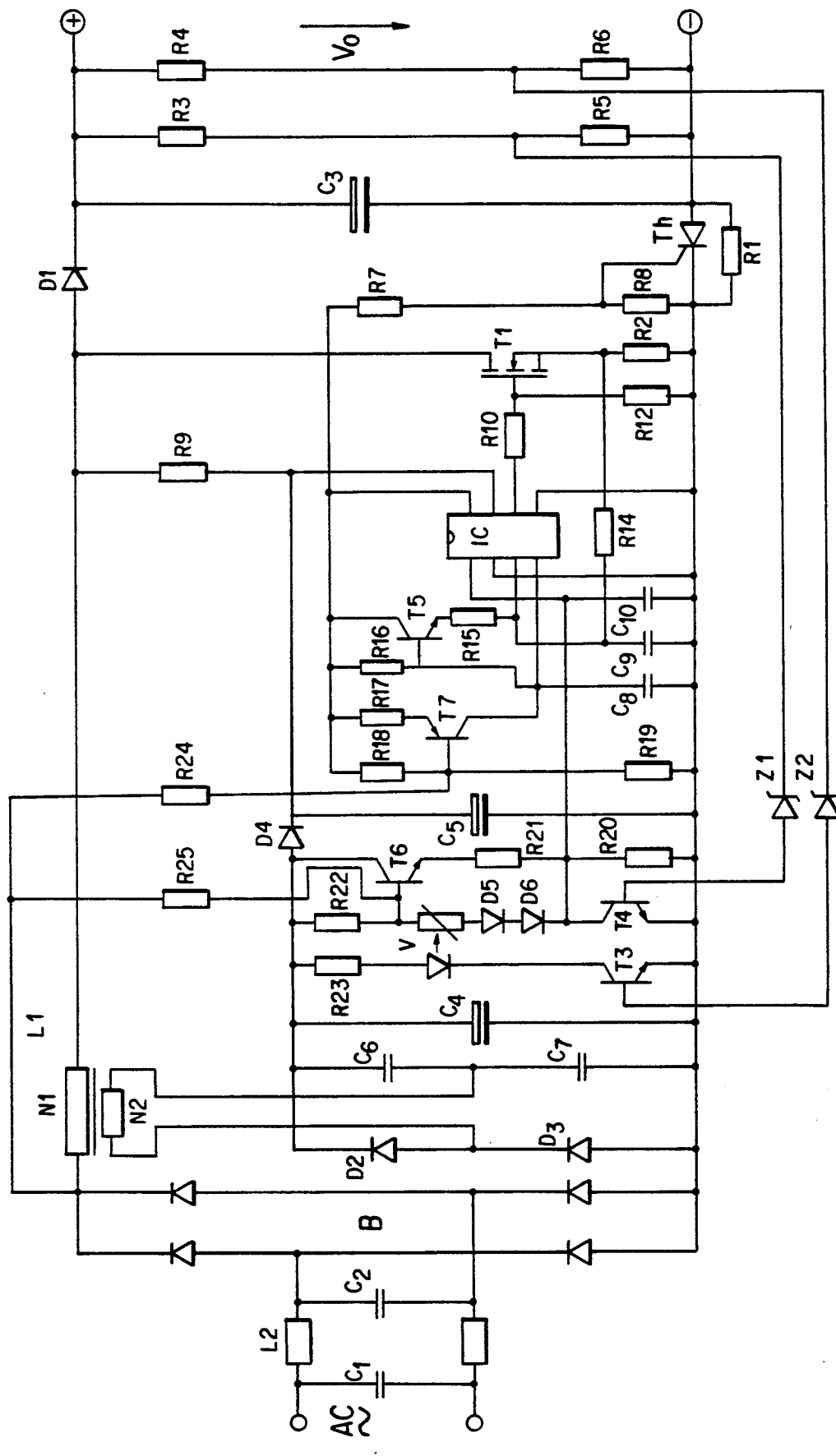
FIG. 7 shows the preferred embodiment of a frequency and amplitude modulated boost converter as power factor corrector.

FIG. 7 shows the preferred embodiment of a frequency and amplitude modulated boost converter as power factor corrector including the elements described with respect to FIGS. 5 and 6.

The practical electronic circuit includes the following units:

1. an input filter provided across the AC source including an inductor L2 and capacitors C1, C2;

2. a bridge rectifier B provided across the AC source;

3. a conventional boost converter configuration including inductor L1, main switch T1, rectifier D1 and output capacitor C3;

4. an auxiliary DC supply as described with respect to FIG. 5 consisting of winding N2, rectifiers D2, D3 and capacitors C6, C7;

5. an inrush current limiter as described with respect to FIG. 6 consisting of thyristor Th and resistors R1, R7, R8;

6. a current mode controller integrated circuit IC, wherein the charging current of timing capacitor C8 is provided by a voltage controlled current source including transistor T7 and resistors R17, R18, R19, R24;

7. a shunt resistor R2 providing proportional voltage signal to the inductor current when the main switch T1 is ON. This proportional voltage signal is connected to the current sense comparator provided within controller integrated circuit IC; the switching noises are filtered by capacitor C9 and resistor R14;

8. an emitter follower providing slope compensation including transistor T5 and resistors R14, R15;

9. a voltage controlled amplifier including a controlled voltage divider consisting of Vactrol V and resistor R25; the Vactrol V combines a solid state light source LED with a photoresistor; the voltage divider is connected to an emitter follower consisting of transistor T6 and resistors R20, R21, the amplitude controlled absolute value sinusoidal voltage signal on resistor R20 is connected to the current sense comparator of control IC; and 10. an error voltage amplifier including a zener diode Z1 providing reference voltage, transistor T3, resistor R23 and the LED of the Vactrol V.

While there have been described what is at present is believed to be the preferred embodiments of this invention, it will be obvious to those skilled in the art that various changes and modifications may be made herein without departing from the invention, and all of these obvious changes and modifications would fall within the true spirit and scope of the invention.

What is claimed is:

1. A pulse width modulated current mode boost converter to provide power factor correction between an input sinusoidal AC voltage source and a load, comprising:

a first full-bridge rectifier provided across the AC source producing a DC output voltage;

a boost converter connected to said full-bridge rectifier;

a pulse width modulated latch;

a main switch and a shunt resistor connected to said pulse width modulated latch;

a current sense comparator connected to said pulse modulated latch and said shunt resistor;

a continuously modulated voltage controlled oscillator connected between said first full bridge rectifier and said pulse width modulated latch, wherein the frequency of said oscillator is continuously modulated by the absolute value of the sinusoidal voltage source such that the frequency of the oscillation is at a maximal level when the absolute value of the sinusoidal voltage source is zero, and is at a minimal level when the absolute value of the sinusoidal input voltage is at a maximal level; and a voltage controlled amplifier connected between said boost converter and said current sense comparator, said voltage controlled amplifier also provided with a DC voltage reference source, wherein the amplitude of the output signal of said voltage controlled amplifier varies with respect to the absolute value of the input sinusoidal voltage and is in phase therewith, and wherein the amplitude of said signal is controlled by the difference of the DC output voltage of said boost converter and said DC reference voltage.

2. The current mode booster converter in accordance with claim 1 further including an auxiliary DC supply for said boost converter provided with an auxiliary winding;

a second full bridge rectifier connected to said auxiliary winding, said second full bridge rectifier provided with two series connected diodes and two series connected capacitors;

a storage capacitor connected to said second full bridge rectifier;

wherein proportionally average auxiliary DC voltage is provided to the regulated output voltage of said boost converter.

3. The current mode converter in accordance with claim 1 further including:

an electronically controlled switch; and
an inrush current limiter provided with a first resistor, wherein input current flows across said electronically controlled switch only if said main switch of said boost converter is OFF.

* * * * *